United States Patent [19]
Shackelford

[11] Patent Number: 6,109,297
[45] Date of Patent: Aug. 29, 2000

[54] DIRECTIONAL DRAIN VALVE

[75] Inventor: George W. Shackelford, Riverside, Calif.

[73] Assignee: Normandy Products, Company, Verona, Pa.

[21] Appl. No.: 09/359,871

[22] Filed: Jul. 27, 1999

[51] Int. Cl.⁷ .................................................. F16K 15/03
[52] U.S. Cl. ................................ 137/527.6; 137/527.8; 251/118
[58] Field of Search ............................. 137/527.8, 527.6; 251/120, 118; 239/203, 204, 505, 506, 518, 521, 523

[56] References Cited

U.S. PATENT DOCUMENTS

| | | | |
|---|---|---|---|
| 1,063,637 | 6/1913 | Barker | 137/527.8 X |
| 2,024,339 | 12/1935 | Connell | 239/521 |
| 2,065,549 | 2/1936 | Balensiefer | 239/523 X |
| 2,668,078 | 2/1954 | Snoddy | 239/204 |
| 4,498,876 | 2/1985 | Zemlicka | 137/527.8 X |
| 4,512,366 | 4/1985 | Lewis | 137/527.8 |
| 4,967,790 | 11/1990 | Ganske | 137/527.8 X |
| 5,044,396 | 9/1991 | Daudet et al. | 137/527.6 X |

*Primary Examiner*—John Rivell
*Assistant Examiner*—Meredith H. Schoenfeld
*Attorney, Agent, or Firm*—Donald D. Mon

[57] ABSTRACT

A drain valve according to this invention comprises a mount, a peripheral flange, and a plate-like valve closure hinged to the mount. The valve closure includes a diverter which directs flow in a direction away from the hinged edge when the valve is open. The valve closure also has two latch arms to limit the amount it can open.

12 Claims, 2 Drawing Sheets

DIRECTIONAL DRAIN VALVE

SPECIFICATION

1. Field of the Invention

A drain valve normally closing the outlet of a drain line which opens to allow flow and discharges it in a direction defined by the valve itself.

2. Background of the Invention

Drain valves which normally close the outlets of drains are well known. They are usually biased closed by gravity. They pop up and permit flow in all lateral directions, the valve plate itself deflecting axial flow away from the outlet.

While useful, they do have the disadvantage that the water discharge goes in all directions, many of which are undesirable. To counter this disadvantage, diverters are sometimes placed ahead of the discharge. When the discharge stream strikes the diverter, it is directed in an off-axis direction. An inherent problem with this arrangement is that unless the valve is further recessed in a surface the diverter itself is always beyond the valve where it can be impacted by pedestrians or equipment. Especially for curbside outlets of subsurface drain pipes, this is not a viable solution. In gardens or near walkways it is often objectionable.

It is an object of this invention to provide a directional drain valve which has upstream of its closure when the drain valve is closed, but downstream of its outlet port when open, a deflector to prevent flow in unwanted directions, and to direct the flow in a selected direction. The entire valve, including the diverter remains flush with the surface when the valve is closed.

BRIEF DESCRIPTION OF THE INVENTION

A drain valve according to this invention comprises a mount, the mount having a central axis and a cylindrical coaxial outer wall. A peripheral flange extends laterally beyond the outer wall, and an axial passage extends through the mount. The cylindrical outer wall is on a depending section below the flange. The drain valve further includes a plate-like valve closure, the valve closure being hinged to the mount so as to pivot from a position closing the passage to a position which permits flow therethrough.

According to a feature of this invention the valve closure includes a diverter that extends partway around the periphery of the valve closure. It projects upstream into the passage when the valve is closed. It rises from the passage along with the valve closure, at the hinged edge, to direct flow in a direction away from the hinged edge.

According to a preferred but optional feature of the invention, two latch arms extend from the valve closure into the passage, with hooks to engage the mount and limit the extent of opening of the valve closure.

The above and other features of this invention will be fully understood from the following detailed description and the accompanying drawings, in which:

DETAILED DESCRIPTION OF THE INVENTION

Figure 1:
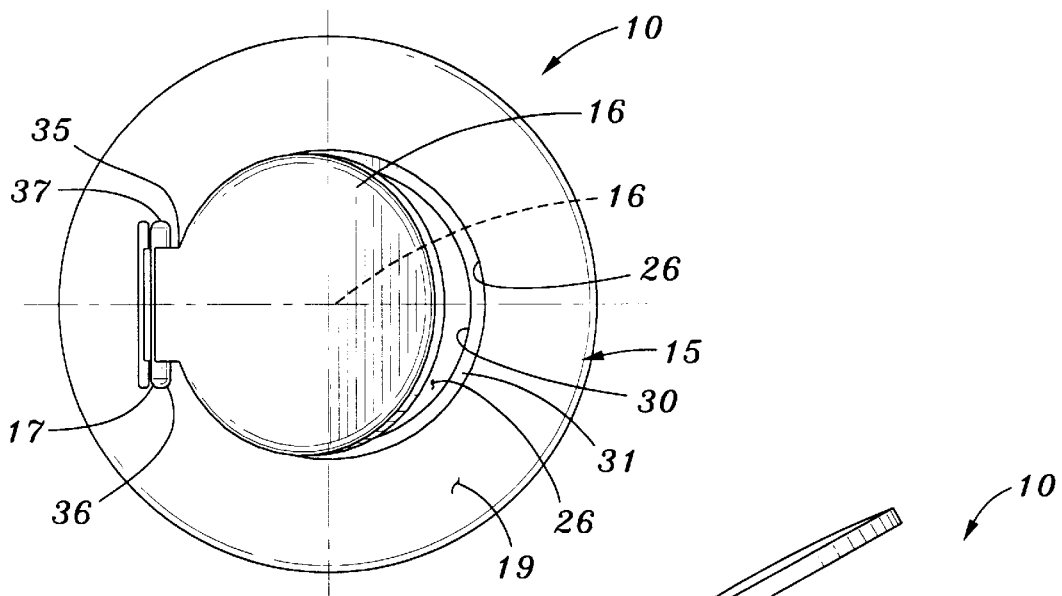
FIG. 1 is a top view of a drain valve according to the invention.
Figure 2:
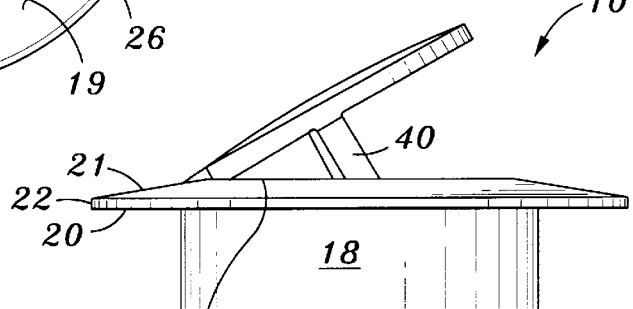
FIG. 2 is a side view of the drain valve shown in FIG. 1.
Figure 3:
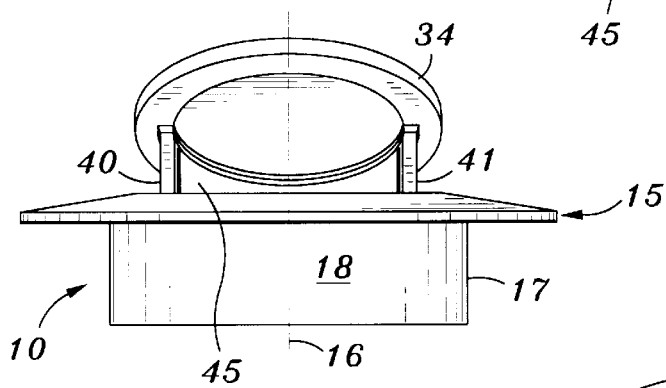
FIG. 3 is a front view of the drain valve.
Figure 4:
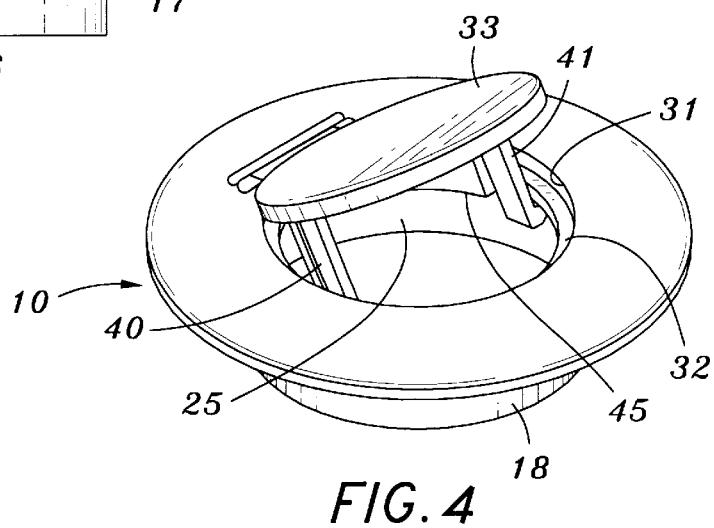
FIG. 4 is a perspective view of the open drain valve.
Figure 7:
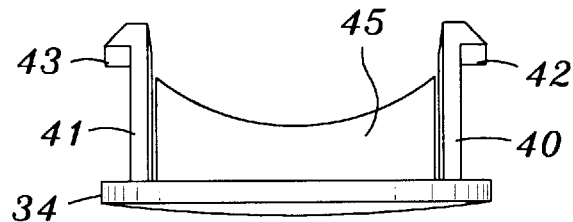
FIG. 7 is a top view of FIG. 5.
Figure 6:
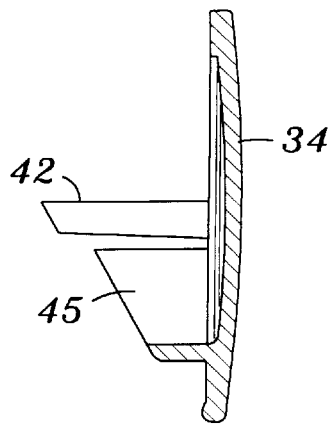
FIG. 6 is a cross-section taken at line 6—6 in FIG. 5.
Figure 5:
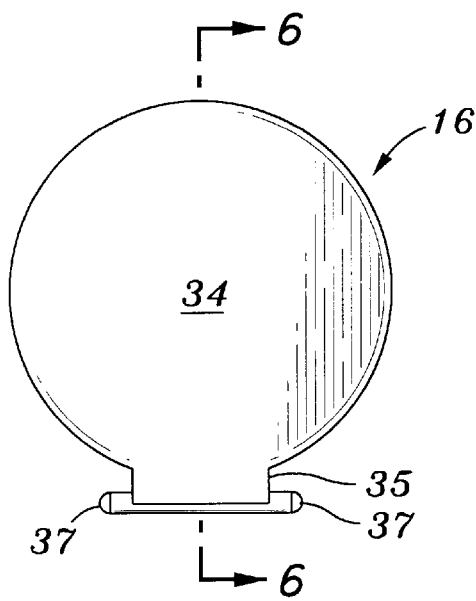
FIG. 5 is a top view of the valve closure of the illustrated drain valve.
Figure 8:
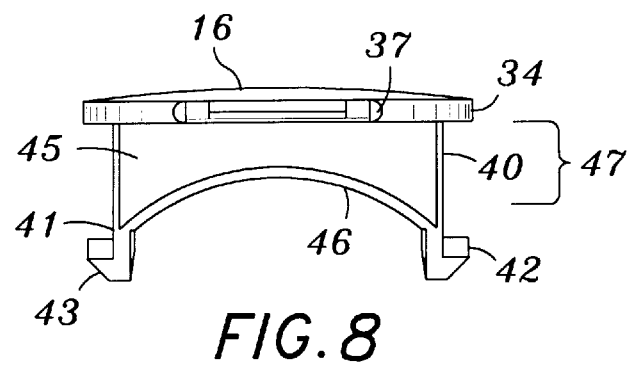
FIG. 8 is a bottom view of FIG. 7.

A drain valve 10 according to the invention is shown in its open position in FIGS. 1–4. It comprises a mount 15 and a valve closure 16 joined together by a hinge 17.

Mount 15 has a central axis 16 and a depending section 17 with a cylindrical outer wall 18. It also includes a peripheral flange 19 that extends outwardly from the outer wall. This flange preferably has a flat bottom surface 20 and a gently sloping top surface 21. Its outer edge 22 is preferably circular.

A central passage 25 extends through the mount from end to end. It is coaxial with axis 16. It terminates at a circular exit port 26.

A circular rim 30 is formed on the inside wall of the passage. In the preferred embodiment, this rim is located a short distance below top surface 21 so as to provide a closure recess 31 to receive valve closure 16 in the closed condition of the drain valve. It also has a latch surface 32 on its bottom edge for a purpose to be described. If it is not desired to have the closure beneath the top surface, the recess 31 may be omitted. This will usually not be preferred.

Valve closure 16 includes a generally circular plate 23 with an edge 34 that can closely fit inside recess 31 when the valve is closed. A hinge plate 35 on the closure fits in a notch 36 in the mount. It carries a pair of hinge pins 37 which engage in recesses in the mount in a known manner.

Two latch arms 40, 41 extend from the closure, extending into the passage. Hooks 42, 43 extend laterally from the latch arms to engage latch surface 32 whereby to limit the hinged movement of the closure. A flat side surface 44 on each latch arm acts as an additional deflector for the water stream.

A deflector 45 depends from the valve closure. It has a side wall that is curved to fit near the inner wall of the passage when the valve is closed. It has a lower edge 46 that is scalloped so as to have a lesser axial length 47 nearer the hinge than angularly away from it. As will be observed in FIGS. 2, 3 and 4, when the valve is open the rear and side portions of the deflector prevent lateral flow past them. At the center portion of the deflector, the portion with lesser length does not excessively enter the stream, but does deflect the stream away from the narrow portion at the hinge. The taller parts of the deflector at the sides deflect the stream in a direction generally away from the hinge. The entire deflector is preferably in the passage upstream from the exit port when the valve is closed. The deflector rises above the exit port when the valve is open.

It will now be seen that this drain valve, when the closure is in the recess, on which merely covers the exit port without entering it, will prevent backflow or entrance of trash or rodents, for example. When water is to be discharged, its force will pivot the closure to the illustrated position, and lateral flow will be directed away from the hinge edge, as limited by the deflector and by the plate.

The external cylindrical wall of the mount enables the entire drain valve to be rotated in the pipe to any angular direction, so that the direction of discharge can be selected and limited. This is useful when the drain valve is to open upwardly into a horizontal surface. It is also useful when the drain is mounted with the flange vertically oriented, with the hinge at the top. Gravity will close the valve in both arrangements. When water opens the valve, the flow will be directed by the plate and by the deflector instead of spraying out in all directions.

This invention thereby provides an easily installed drain valve with useful control over the discharge pattern and direction, all without the need for complicating elements beyond the valve closure.

This invention is not to be limited by the embodiment shown in the drawings and described in the description, which is given by way of example and not of limitation, but only in accordance with the scope of the appended claims.

I claim:

1. A drain valve comprising:
   a mount having a central axis, a peripheral flange, a depending section beneath said flange, a peripheral outer cylindrical wall on said depending section coaxial with said central axis, an axial passage having an inner wall extending through said mount coaxial with said central axis and opening at a top surface of the mount; a peripheral ring in said inner wall of said passage forming a latch edge; and
   a valve closure comprising a plate hinged to said mount to close said passage in one position and to open the passage in another; a pair of latch arms extending from said plate into said passage, a hook on each arm adapted to engage said latch edge to limit the opening movement of the closure; and a deflector integral with said plate, said deflector being so disposed and arranged as to enter the passage when the plate closes said passage, and to rise with the closure when it is pivoted to open the passage, said deflector being curved and of limited peripheral extent, whereby to deflect water incident on it to an intended direction, and preventing flow laterally past it.

2. A drain valve according to claim 1 in which said deflector is a bent plane shaped as a fragment of a cylinder with an outer diameter about equal to the diameter of said inner wall.

3. A drain valve according to claim 2 in which said deflector has a free edge spaced from said closure which is closer to said closure at its mid-point than at its ends.

4. A drain valve according to claim 3 in which said free edge is a smooth curve.

5. A drain valve according to claim 1 in which a hinge pad is formed on said closure, hinge pins on said hinge pads, and in which a socket in said mount receives said hinge pins.

6. A drain valve according to claim 3 in which said latch arms include a deflector surface aligned with said deflector.

7. A drain valve according to claim 1 in which said ring is located on said inner wall beneath said top surface so as to form a closure recess adjacent to the upper surface of the mount to receive said plate when the drain valve is closed.

8. A drain valve according to claim 7 in which said deflector is a bent plane shaped as a fragment of a cylinder with an outer diameter about equal to the diameter of said inner wall.

9. A drain valve according to claim 8 in which said deflector has a free edge spaced from said closure which is closer to said closure at its mid-point than at its ends.

10. A drain valve according to claim 9 in which said free edge is a smooth curve.

11. A drain valve according to claim 7 in which a hinge pad is formed on said closure, hinge pins on said hinge pads, and in which a socket in said mount receives said hinge pins.

12. A drain valve according to claim 8 in which said latch arms include a deflector surface aligned with said deflector.

* * * * *